United States Patent
Fu et al.

(10) Patent No.: US 11,910,068 B2
(45) Date of Patent: Feb. 20, 2024

(54) PANORAMIC RENDER OF 3D VIDEO

(71) Applicant: Shanghai Bilibili Technology Co., Ltd., Shanghai (CN)

(72) Inventors: Lin Fu, Shanghai (CN); Hui Chen, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 223 days.

(21) Appl. No.: 17/517,970

(22) Filed: Nov. 3, 2021

(65) Prior Publication Data

US 2022/0060801 A1 Feb. 24, 2022

Related U.S. Application Data

(63) Continuation of application No. PCT/CN2020/084954, filed on Apr. 15, 2020.

(30) Foreign Application Priority Data

Jun. 17, 2019 (CN) .......................... 201910523360.2

(51) Int. Cl.
*G06F 3/048* (2013.01)
*G06F 3/01* (2006.01)
(Continued)

(52) U.S. Cl.
CPC ............ *H04N 21/816* (2013.01); *G06F 3/01* (2013.01); *G06F 3/048* (2013.01); *H04N 13/139* (2018.05); *H04N 19/597* (2014.11)

(58) Field of Classification Search
CPC ............ G06F 3/04845; G06F 3/04815; G06F 3/0488; G06F 3/04817; G06F 3/011;
(Continued)

(56) References Cited

U.S. PATENT DOCUMENTS 10,194,097 B2* 1/2019 Abbas ................. H04N 23/698
10,924,627 B2* 2/2021 Weems, III ............ G06F 3/011
(Continued)

FOREIGN PATENT DOCUMENTS

CN 102812497 A 12/2012
CN 106023070 A 10/2016
(Continued)

OTHER PUBLICATIONS

International Search Report, dated May 27, 2020, in International application No. PCT/CN2020/084954, filed on May 15, 2020 (4 pages).

*Primary Examiner* — Vijay Shankar
(74) *Attorney, Agent, or Firm* — McAndrews, Held & Malloy, Ltd.

(57) ABSTRACT

A method is provided. The method includes: reading video information of a 3D video to be rendered; determining an image format of the 3D video according to the video information; generating a first spherical model and a second spherical model according to the image format; reading a frame image of the 3D video, where the frame image includes a first sub-image and a second sub-image; obtaining angle-of-view rotation data and image sealing data; rendering the frame image according to the angle-of-view rotation data and the image scaling data, where the first sub-image is rendered to the first spherical model to obtain a first spherical image, and the second sub-image is rendered to the second spherical model to obtain a second spherical image; and outputting images in a viewport area of the first spherical image and the second spherical image to a display device.

17 Claims, 3 Drawing Sheets

(51) Int. Cl.
    *H04N 21/81*           (2011.01)
    *H04N 19/597*        (2014.01)
    *H04N 13/139*        (2018.01)

(58) Field of Classification Search
    CPC .... G06F 3/016; H04N 21/816; H04N 13/139; H04N 19/597; H04N 21/440245; H04N 21/44218; H04N 21/4728; H04N 13/161; H04N 13/106; G06T 15/00
    See application file for complete search history.

(56) References Cited

U.S. PATENT DOCUMENTS

| | | | |
|---|---|---|---|
| 11,303,826 B2* | 4/2022 | Oh | H04N 13/156 |
| 2012/0020548 A1 | 1/2012 | Kao et al. | |
| 2014/0132706 A1 | 5/2014 | Kira et al. | |
| 2018/0205889 A1* | 7/2018 | Abbas | H04N 23/90 |
| 2023/0095173 A1* | 3/2023 | Khosravan | G06T 5/50 |
| | | | 382/254 |

FOREIGN PATENT DOCUMENTS

| | | |
|---|---|---|
| CN | 106097245 A | 11/2016 |
| CN | 106569696 A | 4/2017 |
| CN | 107105218 A | 8/2017 |
| CN | 108174178 A | 6/2018 |
| CN | 109308740 A | 2/2019 |
| CN | 109600603 A | 4/2019 |
| WO | 2018121333 A1 | 7/2018 |

\* cited by examiner

FIG. 3

PANORAMIC RENDER OF 3D VIDEO

CROSS-REFERENCE TO RELATED APPLICATIONS

This application is a continuation under 35 U.S.C. 111(a) of PCT International Application No. PCT/CN2020/084954, filed on Apr. 15, 2020, which claims priority to Chinese Patent Application No. 201910523360.2, filed on Jun. 17, 2019, entitled "Method of panoramic rendering for 3D video, computer device, and readable storage medium", and the entire content of which is incorporated herein by reference.

TECHNICAL FIELD

The present application relates to the technical field of data processing, and in particular to panoramic render of a 3D video.

BACKGROUND

In recent years, with the continuous development of 3D, virtual reality, and other technologies, 3D and virtual reality technologies and products are affecting and changing people's communication, work, entertainment, and lifestyle. Meanwhile, on the basis of improvements in a data processing capability and a storage capability of intelligent mobile terminals, panoramic rendering of a 3D video is implemented on the side of a mobile terminal, so that a user can personally experience a virtual reality scene with a depth anytime and anywhere, and obtain a sense of immersion in the virtual reality scene.

In addition, upgrade and iteration of mobile communications technologies have increased communication bandwidth and network speed, greatly enhanced capabilities of the mobile Internet, and laid the foundation for application of 3D and virtual reality technologies in the field of mobile Internet. Moreover, the rise of the Internet of things and cloud computing has also brought new opportunities for the development of Internet services based on the 3D and virtual reality technologies.

SUMMARY

The present application provides a method of panoramic rendering for a 3D video, including: reading video information of a 3D video to be rendered; determining an image format of the 3D video according to the video information; generating a first spherical model and a second spherical model according to the image format; reading a frame image of the 3D video, where the frame image includes a first sub-image and a second sub-image; obtaining angle-of-view rotation data and image scaling data; rendering the frame image according to the angle-of-view rotation data and the image scaling data, where the first sub-image is rendered to the first spherical model to obtain a first spherical image, and the second sub-image is rendered to the second spherical model to obtain a second spherical image; and outputting images in a viewport area of the first spherical image and the second spherical image to a display device.

The present application further provides a computer device, including one or more processors; and one or more memories storing one or more programs configured to be executed by the one or more processors, the one or more programs comprising instructions for implementing the foregoing method.

The present application further provides a computer-readable storage medium storing one or more programs, the one or more programs comprising instructions, upon executed by one or more processors of an electronic device, cause the electronic device to implement the foregoing method.

DETAILED DESCRIPTION OF EMBODIMENTS

In order to make the objectives, technical solutions, and advantages of the present application clearer, the present application will be further described in detail below in conjunction with the accompanying drawings and embodiments. It should be understood that the specific embodiments described herein are merely intended to explain the present application, but are not intended to limit the present application. All other embodiments obtained by persons of ordinary skill in the art based on the embodiments of the present application without creative efforts shall fall within the scope of protection of the present application.

The inventors found that during implementation of panoramic rendering of a 3D video in the prior art, processing of all frame images of the 3D video needs to be completed before playing, and therefore panoramic real-time playing of the 3D video cannot be implemented. Embodiments of the present application provides a method and apparatus of panoramic rendering for a 3D video, a computer device, and a readable storage medium to implement panoramic real-time playing of the 3D video. In the method of panoramic rendering for a 3D video provided in the embodiments of the present application, first, an image format is determined according to video information of a 3D video; then, two spherical models respectively corresponding to left and right eyes are generated according to the image format, each frame of image, namely, a frame image, is rendered in real time during panoramic rendering, and during the rendering, the current angle-of-view rotation data and image scaling data are first obtained, and then the frame image is directly rendered according to the angle-of-view rotation data and the image scaling data, where a first sub-image is rendered to a first spherical model to obtain a first spherical image, and a second sub-image is rendered to a second spherical model to obtain a second spherical image, both the first spherical image and the second spherical image are spherical images obtained according to the angle-of-view rotation data and the image scaling data; and finally, images in a viewport area in the first spherical image and the second spherical image are respectively output to corresponding display areas of a display device, thereby implementing the panoramic rendering of the frame of 3D image. For all frame images of the 3D video, the steps described above are used for panoramic rendering according to a sequence of frames, thereby implementing panoramic rendering of the 3D video. It can be learned that, in the method of panoramic rendering for a 3D video provided in the embodiments of the present application, the image format is determined according to the video information, and single-frame rendering is implemented for the frame image, so that panoramic rendering of both an offline 3D video and an online 3D video, that is, panoramic real-time playing of a 3D video, can be implemented.

Various embodiments of the method and apparatus of panoramic rendering for a 3D video, the computer device, and the readable storage medium that are provided in the present application will be described in detail below.

Figure 1:
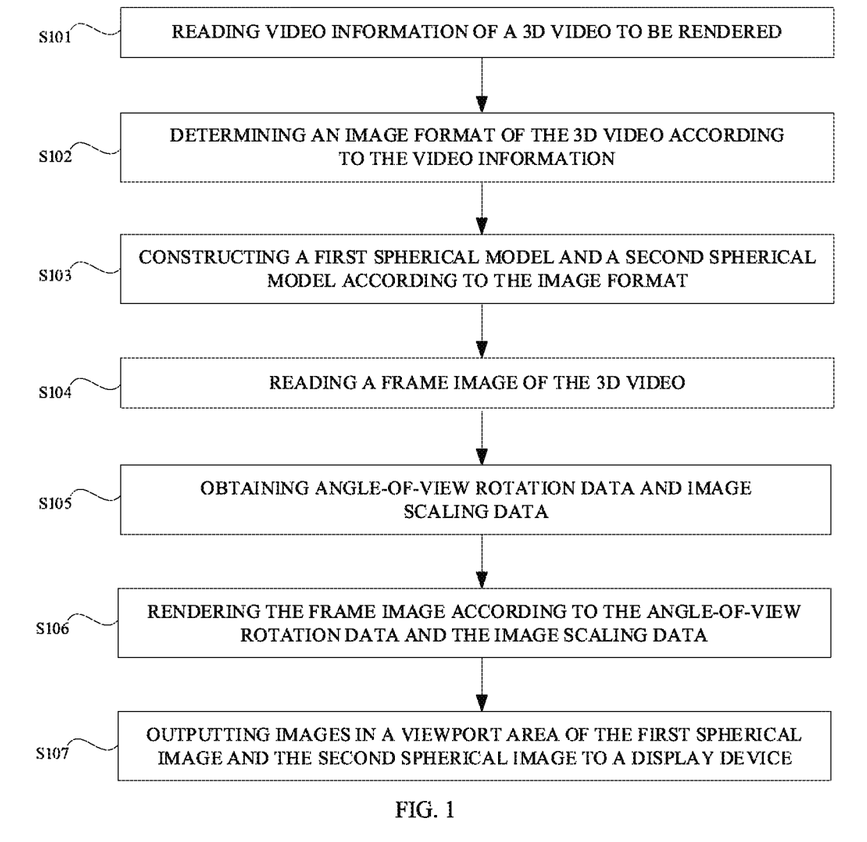
FIG. 1 is a flowchart of a method of panoramic rendering for a 3D video according to Embodiment 1 of the present application.

According to some embodiments, the present application provides a method of panoramic rendering for a 3D video. The method of panoramic rendering can implement panoramic real-time playing of a 3D video. The method of panoramic rendering for a 3D video can be applied to video rendering software. The video rendering software specifically can run on any terminal, such as a mobile phone, VR glasses, and other devices. Specifically, FIG. 1 is a flowchart of a method of panoramic rendering for a 3D video according to some embodiments of the present application. As shown in FIG. 1, the method of panoramic rendering for a 3D video provided in some embodiments includes the following steps S101 to S107.

Step S101: Reading video information of a 3D video to be rendered.

According to some embodiments, the 3D video includes video information and image data, where the video information is information describing properties of the 3D video, such as an image size, image dimensions, a video format, a video source, and other information, and the video information may be transferred as a header file during the transferring of the 3D video. After receiving a 3D video online in real time, or obtaining a locally stored 3D video, video playback software may first read the video information of the 3D video.

Step S102: Determining an image format of the 3D video according to the video information.

In this step, the image format of the 3D video to be rendered is determined according to the video information. For example, in an implementation, an identifier of the image format may be added to the video information, so that in response to obtaining the identifier of the image format by parsing the video information, determining the image format. For another example, in another implementation, the image format is determined according to the image dimensions.

In short, regardless of which implementation is used, in some embodiments, there is no need to parse image data, that is, parse a frame image, and the image format of the 3D video to be rendered can be determined according to only the video information. The image format can reflect composition of an image corresponding to a left eye and an image corresponding to a right eye in a frame image. In other words, after the image format is determined, the image corresponding to the left eye and the image corresponding to the right eye can be separated from the frame image. For example, the image corresponding to the left eye and the image corresponding to the right eye in the frame image are of the same dimensions, and are arranged from up to down to form an up-down format, or are arranged from left to right to form a left-right format. Alternatively, the image corresponding to the left eye and the image corresponding to the right eye in the frame image may be of different dimensions. This is not limited in the present application. Parallax between the image corresponding to the left eye and the image corresponding to the right eye fulfills a requirement of 3D video display.

Step S103: Generating a first spherical model and a second spherical model according to the image format.

After the image format is determined in step S102, that is, the image corresponding to the left eye and the image corresponding to the right eye in the frame image are determined, in step S103, a spherical model is generated for the image corresponding to the left eye, and a spherical model is generated for the image corresponding to the right eye. The two spherical models are defined as the first spherical model and the second spherical model, respectively. When the two spherical models are generated, two mapping relationships that can map the left-eye image to a spherical image and the right-eye image to a spherical image are established.

Step S104: Reading a frame image of the 3D video.

The frame image is a frame of image in the image data that constitutes the 3D video, where the frame image includes a first sub-image and a second sub-image. When the first sub-image is the left-eye image, the second sub-image is the right-eye image. When the first sub-image is the right-eye image, the second sub-image is the left-eye image.

For image data of a locally stored 3D video, each frame of image may be read according to a sequence of frames. For image data of a 3D video received online, each frame of image may be read according to a sequence of frames each time one data packet is received. For image data of a 3D video generated from local real-time processing, each frame of image may be read instantly when generated.

In short, for a frame image of a 3D video obtained in any manner, after each frame of image is read, the following steps S105 to S107 are performed.

Step S105: Obtaining angle-of-view rotation data and image scaling data.

According to some embodiments, a memory of the terminal stores angle-of-view rotation data and image scaling data. During rendering and playing of the 3D video, when an angle-of-view rotation trigger event occurs, the angle-of-view rotation data in the memory is updated; and when an image scaling trigger event occurs, the image scaling data in the memory is updated. The angle-of-view rotation event and the image scaling event each may be changes in a posture and/or position of the terminal due to an operation of a user, or an operation of the user on the terminal device, or the like, and may be, for example, changes in a posture and/or position of a mobile phone that are caused when a user tilts the mobile phone in various directions, or changes in a position of VR glasses that are caused when the user rotates the head, or operations such as swipe and tap by the user on a touch display panel of the terminal.

After the frame of image is read in step S104, in step S105, the angle-of-view rotation data and the image scaling data currently stored in the memory of the terminal are obtained.

Step S106: Rendering the flame image according to the angle-of-view rotation data and the image scaling data.

After the first sub-image is rendered to the first spherical model according to the angle-of-view rotation data and the image scaling data, a first spherical image is obtained. After the second sub-image is rendered to the second spherical model according to the angle-of-view rotation data and the image scaling data, a second spherical image is obtained.

After the frame image is rendered, the first spherical image and the second spherical image are obtained. The first spherical image and the second spherical image are a left-eye spherical image and a right-eye spherical image that satisfy the current angle-of-view requirement and scaling requirement, respectively.

According to some embodiments, a rendering function is set; the angle-of-view rotation data, the image scaling data, and the first sub-image are used as input parameters of the function, and the function outputs the first spherical image; and the angle-of-view rotation data, the image scaling data, and the second sub-image are used as input parameters of the function, and the function outputs the second spherical image.

Step S107: Outputting images in a viewport area of the first spherical image and the second spherical image to a display device.

After the first spherical image and the second spherical image are obtained, the images in the viewport area of the two spherical images are output to display areas on the display device that correspond to the left eye and the right eye. Each frame of image is sequentially output to the display device according to the sequence of frames, that is, the panoramic rendering and playing of the 3D video to be rendered is implemented.

In the method of panoramic rendering for a 3D video provided in some embodiments, the image format of the 3D video to be rendered is determined according to the video information of the 3D video, that is, the composition of the left-eye sub-image (the first sub-image or the second sub-image) and the right-eye sub-image (the second sub-image or the first sub-image) in the frame image is determined; then the spherical models respectively corresponding to the left eye and the right eye are generated according to the image format, and the left-eye sub-image and the right-eye sub-image in each frame of image are sequentially rendered to the corresponding spherical models, to obtain the spherical images corresponding to the left eye and the right eye; and finally, the images in the viewport area of the two spherical images are output to the display areas on the display device that correspond to the left eye and the right eye. When the left-eye sub-image and the right-eye sub-image in each frame of image are rendered to the corresponding spherical models, the current angle-of-view rotation data and image scaling data are obtained, and rendering is performed according to the angle-of-view rotation data and the image scaling data, such that both the spherical images respectively corresponding to the left eye and the right eye and obtained by means of rendering are spherical images that satisfy the current angle-of-view requirement and scaling requirement. Therefore, in the method of panoramic rendering for a 3D video provided in some embodiments, only the video information of the 3D video is required for generating the spherical models; and during rendering of the image data, rendering may be performed frame by frame according to the sequence of frames of the 3D video, so that panoramic real-time playing of the 3D video can be implemented.

According to some embodiments, the video information includes a height and a width of the frame image, and the step of determining an image format of the 3D video according to the video information includes: calculating a ratio of the height to the width, and determining, according to the ratio, whether the image format of the 3D video is an up-down format or a left-right format. When the image format is the up-down format, it indicates that the first sub-image and the second sub-image are sequentially arranged in the height direction. When the image format is the left-right format, it indicates that the first sub-image and the second sub-image are sequentially arranged in the width direction. Whether the image format is the top-bottom format or the left-right format can be determined according to dimensions of the first sub-image and the second sub-image in the height direction and the width direction, respectively, as well as the ratio of the height to the width of the frame image.

According to some embodiments, the video information includes a height and a width of the frame image, and the step of determining an image format of the 3D video according to the video information includes: calculating a ratio of the height to the width; in response to determining the ratio is 1:1, determining that the image format of the 3D video is an up-down format; and in response to determining the ratio is 1:4, determining that the image format of the 3D video is a left-right format.

According to some embodiments, the first sub-image and the second sub-image included in the frame image are of the same dimensions, and each are a rectangular image with a ratio of a height (in a short-side direction) to a width (in a long-side direction) being 1:2. Therefore, when the ratio of the height to the width of the frame image is 1:1, the image format of the 3D video is the up-down format, that is, the first sub-image and the second sub-image are sequentially arranged in the height direction; and when the ratio of the height to the width of the frame image is 1:4, the image format of the 3D video is the left-right format, and the first sub-image and the second sub-image are sequentially arranged in the width direction.

According to some embodiments, the image format is one of an up-down format and a left-right format, and the step of generating a first spherical model and a second spherical model according to the image format includes: in response to determining the image format is the up-down format, setting texture information of the frame image in a range of [0 to 1] in a first direction to correspond to [0 degrees to 360 degrees] of a sphere model, and texture information of the frame image in a range of [0 to $y1/(y1-y2)$] in a second direction to correspond to [90 degrees to 0 degrees to −90 degrees] of the sphere model, to obtain the first spherical model, and setting the texture information of the frame image in the range of [0 to 1] in the first direction to correspond to [0 degrees to 360 degrees] of the sphere model, and texture information of the frame image in a range of [$y3/(y1+y2)$ to 1] in the second direction to correspond to [90 degrees to 0 degrees to −90 degrees] of the sphere model, to obtain the second spherical model, where y1 is the height of the first sub-image, and y2 is the height of the second sub-image; and In response to determining the image format is the left-right format, setting texture information of the frame image in a range of [0 to $x1/(x1+x2)$] in a first direction to correspond to [0 degrees to 360 degrees] of a sphere model, and texture information of the frame image in a range of [0 to 1] in a second direction to correspond to [90 degrees to 0 degrees to −90 degrees] of the sphere model, to obtain the first spherical model, and setting texture information of the frame image in a range of [$x2/(x1+x2)$ to 1] in the first direction to correspond to [0 degrees to 360 degrees] of the sphere model, and the texture information of the frame image in the range of [0 to 1] in the second direction to correspond to [90 degrees to 0 degrees to −90 degrees] of the sphere model, to obtain the second spherical model, where y1 is the width of the first sub-image, and y2 is the width of the second sub-image.

According to some embodiments, the image format is one of an up-down format and a left-right format, and the step of generating a first spherical model and a second spherical model according to the image format includes: in response to determining the image format is the up-down format, setting texture information of the frame image in a range of

[0 to 1] in a first direction to correspond to [0 degrees to 360 degrees] of a sphere model, and texture information of the frame image in a range of [0 to 0.5] in a second direction to correspond to [90 degrees to 0 degrees to −90 degrees] of the sphere model, to obtain the first spherical model, and setting the texture information of the frame image in the range of [0 to 1] in the first direction to correspond to [0 degrees to 360 degrees] of the sphere model, and texture information of the frame image in a range of [0.5 to 1] in the second direction to correspond to [90 degrees to 0 degrees to −90 degrees] of the sphere model, to obtain the second spherical model; and in response to determining the image format is the left-right format, setting texture information of the frame image in a range of [0 to 0.5] in a first direction to correspond to [0 degrees to 360 degrees] of a sphere model, and texture information of the frame image in a range of [0 to 1] in a second direction to correspond to [90 degrees to 0 degrees to −90 degrees] of the sphere model, to obtain the first spherical model, and setting texture information of the frame image in a range of [0.5 to 1] in the first direction to correspond to [0 degrees to 360 degrees] of the sphere model, and the texture information of the frame image in the range of [0 to 1] in the second direction to correspond to [90 degrees to 0 degrees to −90 degrees] of the sphere model, to obtain the second spherical model.

According to some embodiments, the first direction is a direction corresponding to the width of the frame image, and the second direction is a direction corresponding to the height of the frame image. The first spherical model is in essence a mapping relationship for mapping the texture information of the first sub-image (the left-eye image or the right-eye image) in the frame image to a spherical surface, and the second spherical model is in essence a mapping relationship for mapping the texture information of the second sub-image (the right-eye image or the left-eye image) in the frame image to a spherical surface.

The image format is the up-down format, that is, the first sub-image and the second sub-image are sequentially arranged in the second direction of the frame image. In this case, for the first spherical model, the texture information of the frame image in the range of [0 to 1] in the first direction corresponds to [0 degrees to 360 degrees] of the sphere model, and the texture information of the frame image in the range of [0 to 0.5] (namely, the first sub-image) in the second direction corresponds to [90 degrees to 0 degrees to −90 degrees] of the sphere model; for the second spherical model, the texture information of the frame image in the range of [0 to 1] in the first direction corresponds to [0 degrees to 360 degrees] of the sphere model, and the texture information of the frame image in the range of [0.5 to 1] (namely, the second sub-image) in the second direction corresponds to [90 degrees to 0 degrees to −90 degrees] of the sphere model.

The image format is the left-right format, that is, the first sub-image and the second sub-image are sequentially arranged in the first direction of the frame image. In this case, for the first spherical model, the texture information of the frame image in the range of [0 to 0.5] (namely, the first sub-image) in the first direction corresponds to [0 degrees to 360 degrees] of the sphere model, and the texture information of the frame image in the range of [0 to 1] in the second direction corresponds to [90 degrees to 0 degrees to −90 degrees] of the sphere model; the texture information of the frame image in the range of [0.5 to 1] (namely, the second sub-image) in the first direction corresponds to [0 degrees to 360 degrees] of the sphere model, and the texture information of the frame image in the range of [0 to 1] in the second direction corresponds to [90 degrees to 0 degrees to −90 degrees] of the sphere model.

According to some embodiments the angle-of-view rotation data includes a pitch angle, a yaw angle, and a roll angle, and the image scaling data includes a scale factor.

According to some embodiments, the pitch angle, the yaw angle, and the roll angle are definitions of Euler angles, representing three values of any rotation in a three-dimensional space. The pitch angle (also referred to as an elevation angle) represents an angle of rotation around the X axis; the yaw angle (also referred to as a heading angle) represents an angle of rotation around the Y axis; and the roll angle (also referred to as a bank angle) represents an angle of rotation around the Z axis. Any angle-of-view rotation can be defined by means of the Euler angles. When the scale factor is 1 it indicates that the size of the original image remains the same. When the scale factor is 0.5, it indicates that the original image is reduced to its half. When the scale factor is 2, it indicates that the original image is enlarged to its twice.

According to some embodiments, the step of obtaining angle-of-view rotation data and image scaling data includes: obtaining the angle-of-view rotation data output by a sensor in the display device; and determining that the image scaling data is a default value.

According to some embodiments, in the display device, namely, the terminal, a sensor that senses a posture of the terminal is provided, and the sensor detects the posture of the terminal in real time. Euler angles detected are the angle-of-view rotation data. When a detection result output by the sensor is obtained, the angle-of-view rotation data is obtained. On the basis of the angle-of-view rotation data obtained by the sensor, the image scaling data may be determined in any manner, for example, by means of an operation by the user on the display device or the like. Preferably, the image scaling data is determined as the default value, that is, in some smart wearable display devices, there is no need to scale an image in real time. Because the posture of the terminal changes with a posture of the user, it is only necessary to detect the posture of the terminal by using the sensor, and set an appropriate default value.

For example, in a use scenario, a user wears a YR device on his/her head to watch a 3D panoramic video. When the user's head rotates and/or pitches, the sensor detects different Euler angles and obtains angle-of-view rotation data, thereby implementing corresponding 3D panoramic video display. For another example, in another use scenario, a user holds a YR device and participates in a 3D panoramic game. When the user tilts the device to the left, right, forth, and back, the sensor detects different Euler angles and obtains the angle-of-view rotation data, thereby implementing corresponding 3D panoramic game display.

According to some embodiments, the step of obtaining angle-of-view rotation data and image scaling data includes: in response to a single-finger swipe operation on the display device, computing the angle-of-view rotation data; and in response to a two-finger swipe operation on the display device, computing the image scaling data.

According to some embodiments, the display device is provided with a touch display screen. In a specific scenario, a processing chip of the display device stores mapping relationships between operations by the user on the touch display screen and angle-of-view conversion as well as and image scaling, including an angle-of-view direction, an angle-of-view conversion size, and the like. When the user performs a corresponding operation of operations on the touch display screen, the processing chip can obtain the angle-of-view rotation data or the image scaling data according to the mapping relationships.

According to some embodiments, there is a mapping relationship between the single-finger swipe operation by the user on the display device and the angle-of-view conversion. Therefore, in response to the single-finger swipe operation on the display device, the angle-of-view rotation data can be computed. Specifically, a swipe operation with a single finger in a third direction corresponds to an increase in the yaw angle, and a swipe operation with a single finger in a fourth direction corresponds to a decrease in the yaw angle; a swipe operation with a single finger in a fifth direction corresponds to an increase in the roll angle, and a swipe operation with a single finger in a sixth direction corresponds to a decrease in the roll angle. Each of single-finger swipe operations corresponds to one unit angle value. The pitch angle is set to a default value. Therefore, when the display device receives one single-finger swipe operation, the angle-of-view rotation data can be computed according to a direction of the single-finger swipe operation and the unit angle value. The third direction and the fifth direction cross with each other, the third direction is opposite to the fourth direction, and the fifth direction is opposite to the sixth direction.

It should be noted that "first", "second", "third", and "fourth" in the third direction, fourth direction, etc. here and the first direction and the second direction above are merely intended to distinguish each other and does not limit the order. The third direction and the fifth direction may be sequentially the same as the first direction and the second direction, respectively.

According to some embodiments, there is a mapping relationship between the two-finger swipe operation by the user on the display device and the image scaling. Therefore, in response to the two-finger swipe operation on the display device, the image scaling data can be computed. According to some embodiments, in response to the two-finger swipe operation on the display device, the image scaling data is computed. A two-finger stretch operation corresponds to image scaling up, and the two-finger pinch operation corresponds to image scaling down. Each two-finger swipe operation corresponds to one unit change amount. Therefore, when the display device receives one two-finger swipe operation, the image scaling data can be computed according to a stretch/pinch direction corresponding to the two-finger swipe operation and the unit change amount.

According to some embodiments, image rendering is implemented on the basis of OpenGL (Open Graphics Library). OpenGL provides a plurality of image rendering functions, and image rendering may be implemented on the basis of different rendering functions.

According to some embodiments, the step of rendering the frame image according to the angle-of-view rotation data and the image scaling data includes: converting the pitch angle, the yaw angle, and the roll angle into a rotation matrix; multiplying the rotation matrix by a model view transformation matrix in OpenGL, to obtain a first matrix; setting a FOV (field of view) parameter in a projection matrix in OpenGL to the scale factor to obtain a second matrix; multiplying the first matrix by the second matrix to obtain a third matrix; and rendering the frame image according to the third matrix.

According to some embodiments, the pitch angle, the yaw angle, and the roll angle are first expressed by using the rotation matrix, and then the rotation matrix is multiplied by the model view transformation matrix, namely, a modelview matrix, in OpenGL to obtain the first matrix. The FOV parameter in the projection matrix, namely, a project matrix, in OpenGL, is set to the scale factor to obtain the second matrix, and then the first matrix is multiplied by the second matrix to obtain the third matrix. Finally, the image data is rendered according to the third matrix by using a matrix-based rendering function.

According to some embodiments, the step of rendering the frame image according to the angle-of-view rotation data and the image scaling data includes: converting the pitch angle, the yaw angle, and the roll angle into quaternions; and rendering the frame image according to the quaternions and the scale factor.

According to some embodiments, in order to avoid the problem of gimbal lock of the Euler angles, in this embodiment, the pitch angle, the yaw angle, and the roll angle are converted into the quaternions. A specific conversion method is common knowledge in the art, and details are not described herein. Finally, the image data is rendered according to the quaternions and the scale factor by using a quaternions-based rendering function.

According to some embodiments, the step of rendering the frame image according to the angle-of-view rotation data and the image scaling data includes: inputting the pitch angle, the yaw angle, and the roll angle to a LookAt function in OpenGL, and finally, rendering, by the rendering function, the frame image according to a processing result of the LookAt function and the scale factor.

Figure 2:
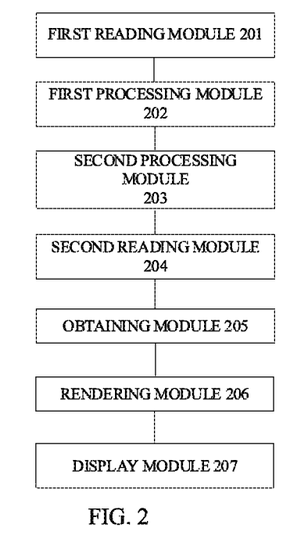
FIG. 2 is a block diagram of a apparatus of panoramic rendering for a 3D video according to Embodiment 2 of the present application.

According to some embodiments, the present application provides a panoramic rendering apparatus for a 3D video. Technical features and technical effects corresponding to some embodiments about the method of panoramic rendering for a 3D video described above are not described again in detail herein, and reference may be made to some embodiments described above. FIG. 2 is a block diagram of a panoramic rendering apparatus for a 3D video according to some embodiments of the present application. As shown in FIG. 2, the apparatus includes a first reading module 201, a first processing module 202, a second processing module 203, a second reading module 204, an obtaining module 205, a rendering module 206, and a display module 207.

The first reading module 201 is configured to read video information of a 3D video to be rendered. The first processing module 202 is configured to determine an image format of the 3D video according to the video information. The second processing module 203 is configured to generate a first spherical model and a second spherical model according to the image format. The second reading module 204 is configured to read a frame image of the 3D video, where the frame image includes a first sub-image and a second sub-image. The obtaining module 205 is configured to obtain angle-of-view rotation data and image scaling data. The rendering module 206 is configured to render the frame image according to the angle-of-view rotation data and the image scaling data, where the first sub-image is rendered to the first spherical model to obtain a first spherical image, and the second sub-image is rendered to the second spherical model to obtain a second spherical image. The display module 207 is configured to output images in a viewport area of the first spherical image and the second spherical image to a display device.

According to some embodiments, the video information includes a height and a width of the frame image, and the first processing module 202, when determining the image format of the 3D video, performs steps specifically including: calculating a ratio of the height to the width; in response to determining the ratio is 1:1, determining that the image format of the 3D video is an up-down format; and in response to determining the ratio is 1:4, determining that the image format of the 3D video is a left-right format.

According to some embodiments, the image format is one of an up-down format and a left-right format, and the second processing module 203, when generating the first spherical model and the second spherical model according to the image format, performs steps specifically including: in response to determining the image format is the up-down format, setting texture information of the frame image in a range of [0 to 1] in a first direction to correspond to [0 degrees to 360 degrees] of a sphere model, and texture information of the frame image in a range of [0 to 0.5] in a second direction to correspond to [90 degrees to 0 degrees to −90 degrees] of the sphere model, to obtain the first spherical model, and setting the texture information of the frame image in the range of [0 to 1] in the first direction to correspond to [0 degrees to 360 degrees] of the sphere model, and texture information of the frame image in a range of [0.5 to 1] in the second direction to correspond to [90 degrees to 0 degrees to −90 degrees] of the sphere model, to obtain the second spherical model; and in response to determining the image format is the left-right format, setting texture information of the frame image in a range of [0 to 0.5] in a first direction to correspond to [0 degrees to 360 degrees] of a sphere model, and texture information of the frame image in a range of [0 to 1] in a second direction to correspond to [90 degrees to 0 degrees to −90 degrees] of the sphere model, to obtain the first spherical model, and setting texture information of the frame image in a range of [0.5 to 1] in the first direction to correspond to [0 degrees to 360 degrees] of the sphere model, and the texture information of the frame image in the range of [0 to 1] in the second direction to correspond to [90 degrees to 0 degrees to −90 degrees] of the sphere model, to obtain the second spherical model.

According to some embodiments, the angle-of-view rotation data includes a pitch angle, a yaw angle, and a roll angle, and the image scaling data includes a scale factor.

According to some embodiments, the obtaining module 205, when obtaining the angle-of-view rotation data and the image scaling data, performs steps specifically including: obtaining the angle-of-view rotation data output by a sensor in the display device; and determining that the image scaling data is a default value.

According to some embodiments, when obtaining the angle-of-view rotation data and the image scaling data, the obtaining module 205 performs: in response to a single-finger swipe operation on the display device, computing the angle-of-view rotation data; and in response to a two-finger swipe operation on the display device, computing the image scaling data.

According to some embodiments, the rendering module 206, when rendering the frame image according to the angle-of-view rotation data and the image scaling data, performs steps specifically including: converting the pitch angle, the yaw angle, and the roll angle into a rotation matrix; multiplying the rotation matrix by a model view transformation matrix in OpenGL to obtain a first matrix; setting a FOV parameter in a projection matrix in OpenGL to the scale factor to obtain a second matrix; multiplying the first matrix by the second matrix to obtain a third matrix; and rendering the frame image according to the third matrix.

According to some embodiments, the rendering module 206, when rendering the frame image according to the angle-of-view rotation data and the image scaling data, performs steps specifically including: the step of rendering the frame image according to the angle-of-view rotation data and the image scaling data includes: converting the pitch angle, the yaw angle, and the roll angle into quaternions; and rendering the frame image according to the quaternions and the scale factor.

Figure 3:
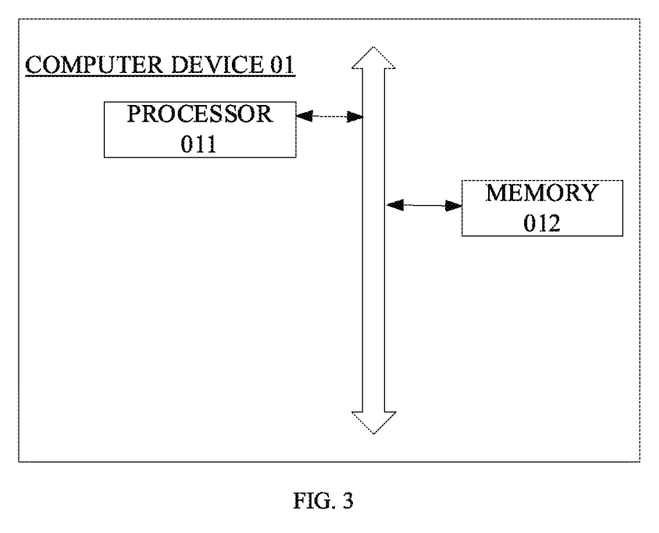
FIG. 3 is a structural diagram of hardware of a computer device according to Embodiment 3 of the present application.

According to some embodiments, a computer device, such as a smartphone, a tablet computer, a notebook computer, a desktop computer, a rack server, a blade server, a tower server, or a cabinet server (including a standalone server or a server cluster consisting of a plurality of servers) that can execute a program is further provided. As shown in FIG. 3, the computer device 01 in some embodiments includes but is not limited to at least: a memory 011 and a processor 012 that can be communicatively connected to each other by using a system bus, as shown in FIG. 3. It should be noted that FIG. 3 shows only the computer device 01 having the component memory 011 and the processor 012, but it should be understood that not all of the illustrated components are required to be implemented, and more or fewer components may be implemented instead.

According to some embodiments, the memory 011 (namely, a readable storage medium) includes a flash memory, a hard disk, a multimedia card, a card-type memory (e.g., an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the memory 011 may be an internal storage unit of the computer device 01, for example, a hard disk or a memory of the computer device 01. In some other embodiments, the memory 011 may alternatively be an external storage device of the computer device 01, for example, a plug-in hard disk, a smart media card (SMC), a secure digital (SD) card, or a flash card provided on the computer device 01. Certainly, the memory 011 may alternatively include both an internal storage unit of the computer device 01 and an external storage device thereof. In some embodiments, the memory 011 is generally configured to store an operating system and various application software installed on the computer device 01, for example, program code for the method of panoramic rendering for a 3D video of some embodiments. In addition, the memory 011 may be further configured to temporarily store various types of data that has been output or will be output.

The processor 012 may be, in some embodiments, a central processing unit (CPU), a controller, a microcontroller, a microprocessor, or other data processing chips. The processor 012 is generally configured to control overall operations of the computer device 01. In some embodiments, the processor 012 is configured to run program code stored in the memory 011 or process data to implement, for example, the method of panoramic rendering for a 3D video.

According to some embodiments, a computer-readable storage medium, such as a flash memory, a hard disk, a multimedia card, a card-type memory (e.g., an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, a server, or an App store is further provided. The computer-readable storage medium stores computer-readable instructions, and when the program is executed by a processor, corresponding functions are performed. The computer-readable storage medium of some embodiments is configured to store instructions, and the instructions, when executed by the processor, implement the following method steps:

reading video information of a 3D video to be rendered;

determining an image format of the 3D video according to the video information;

generating a first spherical model and a second spherical model according to the image format;

reading a frame image of the 3D video, where the frame image includes a first sub-image and a second sub-image;

obtaining angle-of-view rotation data and image scaling data;

rendering the frame image according to the angle-of-view rotation data and the image scaling data, where the first sub-image is rendered to the first spherical model to obtain a first spherical image, and the second sub-image is rendered to the second spherical model to obtain a second spherical image; and outputting images in a viewport area of the first spherical image and the second spherical image to a display device.

According to the method of panoramic rendering for a 3D video, the computer device, and the readable storage medium that are provided in the present application, the image format of the 3D video to be rendered is determined according to the video information of the 3D video, that is, the composition of the left-eye sub-image (the first sub-image or the second sub-image) and the right-eye sub-image (the second sub-image or the first sub-image) in the frame image is determined; then the spherical models respectively corresponding to the left eye and the right eye are generated according to the image format, and the left-eye sub-image and the right-eye sub-image in each frame of image are sequentially rendered to the corresponding spherical models, to obtain the spherical images corresponding to the left eye and the right eye; and finally, the images in the viewport area of the two spherical images are output to the display areas on the display device that correspond to the left eye and the right eye. When the left-eye sub-image and the right-eye sub-image in each frame of image are rendered to the corresponding spherical models, the current angle-of-view rotation data and image scaling data are obtained, and rendering is performed according to the angle-of-view rotation data and the image scaling data, such that both the spherical images respectively corresponding to the left eye and the right eye and obtained by means of rendering are spherical images that satisfy the current angle-of-view requirement and scaling requirement. Therefore, in the method of panoramic rendering for a 3D video provided in some embodiments, only the video information of the 3D video is required for generating the spherical models; and during rendering of the image data, rendering may be performed frame by frame according to the sequence of frames of the 3D video, so that panoramic real-time playing of the 3D video can be implemented.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus in the absence of more restrictions, an element defined by the statement "including a . . . " does not exclude another same element in a process, method, article, or apparatus that includes the element.

The serial numbers of the embodiments of the present application described above are merely for description, and do not indicate that the embodiments are good or bad.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation.

Only preferred embodiments of the present application are described above, and are not intended to limit the patent scope of the present application. Any equivalent structure or equivalent process transformation made using the content of the specification and accompanying drawings of the present application, or any direct or indirect application thereof in other related technical fields shall equally fall within the patent protection scope of the present application.

What is chimed is:

1. A method, comprising:

reading video information of the three-dimension (3D) video to be rendered;

determining an image format of the 3D video according to the video information;

generating a first spherical model and a second spherical model according to the image format;

reading a frame image of the 3D video, wherein the frame image comprises a first sub-image and a second sub-image;

obtaining angle-of-view rotation data and image scaling data;

rendering the frame image according to the angle-of-view rotation data and the image scaling data, wherein the first sub-image is rendered to the first spherical model to obtain a first spherical image, and the second sub-image is rendered to the second spherical model to obtain a second spherical image; and outputting images in a viewport area of the first spherical image and the second spherical image to a display device, wherein the video information comprises a height and a width of the frame image, and the determining an image format of the 3D video comprises:

calculating a ratio of the height to the width;

in response to determining the ratio is 1:1, determining that the image format of the 3D video is an up-down format; and in response to determining the ratio is 1:4, determining that the image format of the 3D video is a left-right format.

2. The method according to claim 1, wherein the image format is one of an up-down format and a left-right format, and the generating a first spherical model and a second spherical model comprises:

in response to determining the image format is the up-down format, setting texture information of the frame image in a range of [0 to 1] in a first direction to correspond to [0 degrees to 360 degrees] of a sphere model, and texture information of the frame image in a range of [0 to 0.5] in a second direction to correspond to [90 degrees to 0 degrees to −90 degrees] of the sphere model, to obtain the first spherical model, and setting the texture information of the frame image in the range of [0 to 1] in the first direction to correspond to [0 degrees to 360 degrees] of the sphere model, and texture information of the frame image in a range of [0.5 to 1] in the second direction to correspond to [90 degrees to 0 degrees to −90 degrees] of the sphere model, to obtain the second spherical model; and in response to determining the image format is the left-right format, setting texture information of the frame image in a range of [0 to 0.5] in a first direction to correspond to [0 degrees to 360 degrees] of a sphere model, and texture information of the frame image in a range of [0 to 1] in a second direction to correspond to [90 degrees to 0 degrees to −90 degrees] of the sphere model, to obtain the first spherical model, and setting the texture information of the frame image in the range of [0.5 to 1] in the first direction to correspond to [0 degrees to 360 degrees] of the sphere model, and texture information of the frame image in a range of [0 to 1] in the second direction to correspond to [90 degrees to 0 degrees to −90 degrees] of the sphere model, to obtain the second spherical model.

3. The method according to claim 1, wherein the angle-of-view rotation data comprises a pitch angle, a yaw angle, and a roll angle, and the image scaling data comprises a scale factor.

4. The method according to claim 3, wherein the obtaining angle-of-view rotation data and image scaling data comprises:
    obtaining the angle-of-view rotation data output by a sensor in the display device; and
    determining that the image scaling data is a default value.

5. The method according to claim 3, wherein the obtaining angle-of-view rotation data and image scaling data comprises:
    in response to a single-finger swipe operation on the display device, computing the angle-of-view rotation data; and
    in response to a two-finger swipe operation on the display device, computing the image scaling data.

6. The method according to claim 3, wherein the rendering the frame image according to the angle-of-view rotation data and the image scaling data comprises:
    converting the pitch angle, the yaw angle, and the roll angle into a rotation matrix;
    multiplying the rotation matrix by a model view transformation matrix in Open Graphics Library (OpenGL) to obtain a first matrix;
    setting a field of view (FOV) parameter in a projection matrix in OpenGL to the scale factor to obtain a second matrix;
    multiplying the first matrix by the second matrix to obtain a third matrix; and
    rendering the frame image according to the third matrix.

7. The method according to claim 3, wherein the rendering the frame image comprises:
    converting the pitch angle, the yaw angle, and the roll angle into quaternions; and
    rendering the frame image according to the quaternions and the scale factor.

8. The method according to claim 3, wherein the rendering the frame image comprises:
    inputting the pitch angle, the yaw angle, and the roll angle to a LookAt function in OpenGL to obtain a processing result, and
    rendering, by a rendering function, the frame image according to the processing result and the scale factor.

9. A computer device, comprising:
    one or more processors; and
    one or more memories storing one or more programs configured to be executed by the one or more processors, the one or more programs comprising instructions for:
    reading video information of a 3D video to be rendered;
    determining an image format of the 3D video according to the video information;
    generating a first spherical model and a second spherical model according to the image format;
    reading a frame image of the 3D video, wherein the frame image comprises a first sub-image and a second sub-image;
    obtaining angle-of-view rotation data and image scaling data;
    rendering the frame image according to the angle-of-view rotation data and the image scaling data, wherein the first sub-image is rendered to the first spherical model to obtain a first spherical image, and the second sub-image is rendered to the second spherical model to obtain a second spherical image; and
    outputting images in a viewport area of the first spherical image and the second spherical image to a display device,
    wherein the one or more programs further comprise instructions for:
    calculating a ratio of the height to the width;
    in response to determining the ratio is 1:1, determining that the image format of the 3D video is an up-down format; and
    in response to determining the ratio is 1:4, determining that the image format of the 3D video is a left-right format.

10. The computer device according to claim 9, wherein the one or more programs further comprise instructions for:
    in response to determining the image format is an up-down format, setting texture information of the frame image in a range of [0 to 1] in a first direction to correspond to [0 degrees to 360 degrees] of a sphere model, and texture information of the frame image in a range of [0 to 0.5] in a second direction to correspond to [90 degrees to 0 degrees to −90 degrees] of the sphere model, to obtain the first spherical model, and setting the texture information of the frame image in the range of [0 to 1] in the first direction to correspond to [0 degrees to 360 degrees] of the sphere model, and texture information of the frame image in a range of [0.5 to 1] in the second direction to correspond to [90 degrees to 0 degrees to −90 degrees] of the sphere model, to obtain the second spherical model; and
    in response to determining the image format is a left-right format, setting texture information of the frame image in a range of [0 to 0.5] in a first direction to correspond to [0 degrees to 360 degrees] of a sphere model, and texture information of the frame image in a range of [0 to 1] in a second direction to correspond to [90 degrees to 0 degrees to −90 degrees] of the sphere model, to obtain the first spherical model, and setting the texture information of the frame image in the range of [0.5 to 1] in the first direction to correspond to [0 degrees to 360 degrees] of the sphere model, and texture information of the frame image in a range of [0 to 1] in the second direction to correspond to [90 degrees to 0 degrees to −90 degrees] of the sphere model, to obtain the second spherical model.

11. The computer device according to claim 9, wherein the angle-of-view rotation data comprises a pitch angle, a yaw angle, and a roll angle, and the image scaling data comprises a scale factor.

12. The computer device according to claim 11, wherein the one or more programs further comprise instructions for:
obtaining the angle-of-view rotation data output by a sensor in the display device; and
determining that the image scaling data is a default value.

13. The computer device according to claim 11, wherein the one or more programs further comprise instructions for:
in response to a single-finger swipe operation on the display device, computing the angle-of-view rotation data; and
in response to a two-finger swipe operation on the display device, computing the image scaling data.

14. The computer device according to claim 11, wherein the one or more programs further comprise instructions for:
converting the pitch angle, the yaw angle, and the roll angle into a rotation matrix;
multiplying the rotation matrix by a model view transformation matrix in Open Graphics Library (OpenGL) to obtain a first matrix;
setting a field of view (FOV) parameter in a projection matrix in OpenGL to the scale factor to obtain a second matrix;
multiplying the first matrix by the second matrix to obtain a third matrix; and
rendering the frame image according to the third matrix.

15. The computer device according to claim 11, wherein the one or more programs further comprise instructions for:
converting the pitch angle, the yaw angle, and the roll angle into quaternions; and
rendering the frame image according to the quaternions and the scale factor.

16. A non-transitory computer-readable storage medium storing one or more programs, the one or more programs comprising instructions, upon executed by one or more processors of an electronic device, cause the electronic device to perform operations comprising:
reading video information of a 3D video to be rendered;
determining an image format of the 3D video according to the video information;
generating a first spherical model and a second spherical model according to the image format;
reading a frame image of the 3D video, wherein the frame image comprises a first sub-image and a second sub-image;
obtaining angle-of-view rotation data and image scaling data;
rendering the frame image according to the angle-of-view rotation data and the image scaling data, wherein the first sub-image is rendered to the first spherical model to obtain a first spherical image, and the second sub-image is rendered to the second spherical model to obtain a second spherical image; and
outputting images in a viewport area of the first spherical image and the second spherical image to a display device,
wherein the one or more programs further comprising instructions, upon executed by the one or more processors of the electronic device, cause the electronic device to perform operations comprising:
calculating a ratio of the height to the width;
in response to determining the ratio is 1:1, determining that the image format of the 3D video is an up-down format; and
in response to determining the ratio is 1:4, determining that the image format of the 3D video is a left-right format.

17. The non-transitory computer-readable storage medium according to claim 16, wherein the one or more programs further comprising instructions, upon executed by the one or more processors of the electronic device, cause the electronic device to perform operations comprising:
in response to determining the image format is an up-down format, setting texture information of the frame image in a range of [0 to 1] in a first direction to correspond to [0 degrees to 360 degrees] of a sphere model, and texture information of the frame image in a range of [0 to 0.5] in a second direction to correspond to [90 degrees to 0 degrees to −90 degrees] of the sphere model, to obtain the first spherical model, and setting the texture information of the frame image in the range of [0 to 1] in the first direction to correspond to [0 degrees to 360 degrees] of the sphere model, and texture information of the frame image in a range of [0.5 to 1] in the second direction to correspond to [90 degrees to 0 degrees to −90 degrees] of the sphere model, to obtain the second spherical model; and
in response to determining the image format is a left-right format, setting texture information of the frame image in a range of [0 to 0.5] in a first direction to correspond to [0 degrees to 360 degrees] of a sphere model, and texture information of the frame image in a range of [0 to 1] in a second direction to correspond to [90 degrees to 0 degrees to −90 degrees] of the sphere model, to obtain the first spherical model, and setting the texture information of the frame image in the range of [0.5 to 1] in the first direction to correspond to [0 degrees to 360 degrees] of the sphere model, and texture information of the frame image in a range of [0 to 1] in the second direction to correspond to [90 degrees to 0 degrees to −90 degrees] of the sphere model, to obtain the second spherical model.

* * * * *